(12) United States Patent
Holmberg et al.

(10) Patent No.: US 11,088,825 B2
(45) Date of Patent: Aug. 10, 2021

(54) BLOCKCHAIN PARTIAL LEDGERS

(71) Applicant: Hewlett-Packard Development Company, L.P., Spring, TX (US)

(72) Inventors: Mike A Holmberg, Boise, ID (US); Nataraj Kumar Gobbak, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 174 days.

(21) Appl. No.: 16/498,962

(22) PCT Filed: Apr. 11, 2017

(86) PCT No.: PCT/US2017/027010
§ 371 (c)(1),
(2) Date: Sep. 27, 2019

(87) PCT Pub. No.: WO2018/190809
PCT Pub. Date: Oct. 18, 2018

(65) Prior Publication Data
US 2021/0091924 A1    Mar. 25, 2021

(51) Int. Cl.
| | | |
|---|---|---|
| H04L 9/06 | (2006.01) | |
| G06Q 20/06 | (2012.01) | |
| G06Q 20/22 | (2012.01) | |
| G06Q 20/38 | (2012.01) | |
| G06Q 20/02 | (2012.01) | |

(52) U.S. Cl.
CPC .......... *H04L 9/0618* (2013.01); *H04L 9/0643* (2013.01); *H04L 2209/38* (2013.01)

(58) Field of Classification Search
CPC . H04L 9/0618; H04L 9/0643; H04L 2209/38; G06Q 2220/00; G06Q 20/065; G06Q 20/223; G06Q 20/38; G06Q 20/02
See application file for complete search history.

(56) References Cited

U.S. PATENT DOCUMENTS

| | | | |
|---|---|---|---|
| 9,268,806 B1* | 2/2016 | Kesselman | G06F 16/2255 |
| 2002/0152142 A1 | 10/2002 | Schellmann | |
| 2005/0210049 A1* | 9/2005 | Foster | G06F 21/6227 |

(Continued)

FOREIGN PATENT DOCUMENTS

| | | |
|---|---|---|
| JP | 2003-530647 | 10/2003 |
| KR | 2015-0122226 | 10/2015 |

(Continued)

OTHER PUBLICATIONS

Croman et al: "On Scaling Decentralized Blockchains (A Position Paper)", Financial Cryptography and Data Security : FC 2016 Workshops, Feb. 26, 2016 20 pages.

(Continued)

*Primary Examiner* — Darren B Schwartz
(74) *Attorney, Agent, or Firm* — HP Inc. Patent Department

(57) ABSTRACT

Examples disclosed herein relate to receiving a record of a data transaction between two participants, creating a ledger entry associated with the record of the data transaction, appending the ledger entry to a subset of a plurality of partial ledgers associated with a blockchain, and updating a table of contents associated with each of the plurality of partial ledgers associated with the blockchain.

13 Claims, 4 Drawing Sheets

(56) References Cited

U.S. PATENT DOCUMENTS

| | | | |
|---|---|---|---|
| 2006/0116989 A1* | 6/2006 | Bellamkonda | G06F 16/24556 |
| 2012/0027212 A1* | 2/2012 | Ruland | H04L 9/12 |
| | | | 380/278 |
| 2014/0279384 A1 | 9/2014 | Loevenich | |
| 2015/0310424 A1* | 10/2015 | Myers | G06Q 20/3678 |
| | | | 705/69 |
| 2016/0260169 A1 | 9/2016 | Arnold | |
| 2016/0261690 A1 | 9/2016 | Ford | |
| 2016/0292672 A1 | 10/2016 | Fay | |
| 2016/0330034 A1 | 11/2016 | Back et al. | |
| 2016/0357743 A1* | 12/2016 | Swaminathan | G06F 16/2255 |
| 2017/0149819 A1* | 5/2017 | Androulaki | H04L 9/3236 |
| 2017/0213209 A1* | 7/2017 | Dillenberger | H04L 9/3247 |
| 2017/0236120 A1* | 8/2017 | Herlihy | G06F 21/57 |
| | | | 705/67 |
| 2017/0236123 A1* | 8/2017 | Ali | G06Q 20/3825 |
| | | | 705/75 |
| 2018/0068130 A1* | 3/2018 | Chan | G06F 21/64 |
| 2018/0089041 A1* | 3/2018 | Smith | G06F 16/2255 |
| 2018/0165476 A1* | 6/2018 | Carey | G06F 21/577 |

FOREIGN PATENT DOCUMENTS

| | | |
|---|---|---|
| KR | 2016-0150278 | 12/2016 |
| KR | 10-1701131 | 2/2017 |
| WO | WO-2016-141361 | 9/2016 |
| WO | WO-17006134 | 1/2017 |
| WO | WO-17006136 | 1/2017 |

OTHER PUBLICATIONS

Frey et al: "Bringing secure Bitcoin transactions to your smartphone", ARM 2016, Dec. 12, 2016, pp. 1-6.

Wood ~ "POLKADOT: Vision for a Heterogeneous Multi-Chain Framework", Dec. 8, 2016, pp. 1-21 ~ Retrieved from the Internet.

Jean-Luc ~ NXT 2.0 Overview, May 23, 2016, https://nxt.org/nxt-2-0-overview/ ~ 7 pages.

* cited by examiner

BLOCKCHAIN PARTIAL LEDGERS

BACKGROUND

A blockchain is a distributed database that maintains a continuously growing list of ordered ledger entries. Each entry comprises a timestamp and a link to a previous block. As transactions occur between participants, a ledger entry is created identifying those participants and the details of the transaction, such as a data transformation, transfer of authority, a log record, etc.

BRIEF DESCRIPTION OF THE DRAWINGS

In the accompanying drawings, like numerals refer to like components or blocks. The following detailed description references the drawings, wherein.

DETAILED DESCRIPTION

Figure 1:
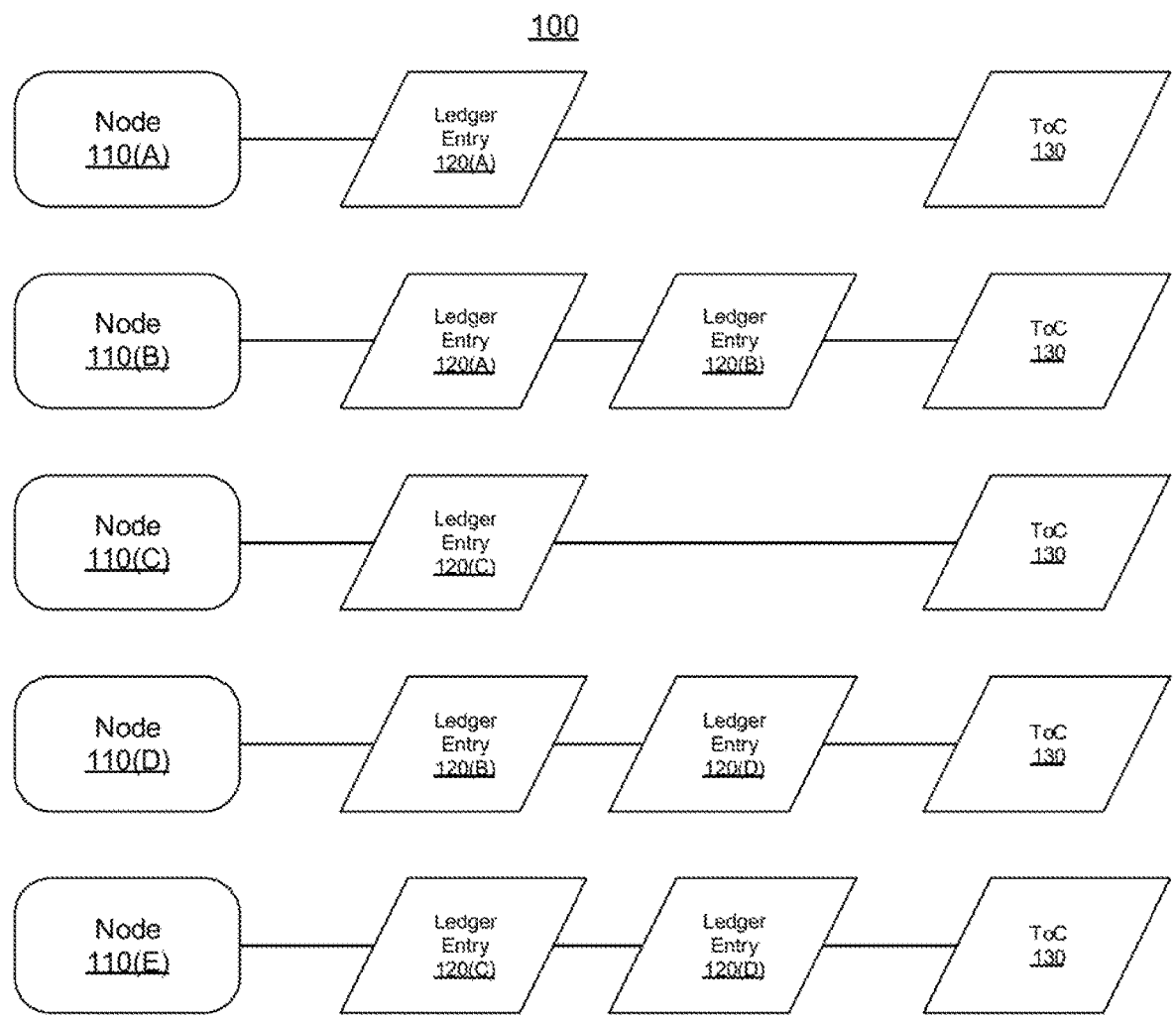
FIG. 1 is a block diagram of an example distributed ledger blockchain.

In some situations, transaction details may be recorded in blockchain storage. Blockchains are often distributed and stored by multiple locations controlled by multiple participants. Because of this distribution, blockchains are inherently resistant to modification of the data. Once recorded, the data in a ledger entry cannot be altered retroactively. Through the use of a peer-to-peer network and a distributed timestamping server, a blockchain database is managed autonomously. Blockchains are thus a distributed ledger that can record transactions between two parties efficiently and in a verifiable and permanent way.

Implementation of blockchain technology requires creation of a common ledger, timestamped, such that each participant in the blockchain community can validate proper authorship and the history of transactions. As the blockchain size grows with each new author/node or each new transaction, keeping the many multiple copies of the common ledger can require a larger and larger amount of digital storage space. The distributed ledger requirement for blockchain technology thus places a large burden on data storage and processing bandwidth. By distributing a table of contents (ToC) and partial ledger storage among transaction participants and/or authors, the efficiency of the ledger storage may be greatly enhanced and alleviate a data storage bottleneck as the ToC is smaller than the ledger itself. This approach also maintains the ability for continuous distributed ledger validation, which is a requirement for blockchain technology implementation.

As the size of a blockchain grows over continual transactions, the storage requirements grow exponentially due to the requirement to maintain a large number of copies of the entire blockchain ledger of transactions. A complete duplicate copy is intended to be stored at each location and/or by each transaction participant. Each new participant to a transaction associated with a blockchain thus adds to every participant's storage requirements.

By having each participant store only those ledger entries associated with their own transactions, these storage requirements are greatly reduced. Each storage location may use a table of contents (ToC) to track other blockchain participants and the storage location for their transaction ledger entries rather than maintaining a full copy of the entire blockchain. The ToC may have individual copies stored at each partial ledger location and/or an authoritative copy may be stored by one and/or more locations while other partial ledger locations maintain a link and/or pointer to those authoritative copies. The ToC may be the only component that needs timestamping as the partially distributed ledgers remain static, only changing where and at which node the ToC dictates. Current blockchain distributed ledgers remember the "Who" and "What" of every transaction. A distributed partial ledger remembers the "Who" of every transaction, but only stores the "What" as it is relevant to that participant.

FIG. 1 is a block diagram of an example distributed ledger blockchain 100. Blockchain 100 may be associated with a plurality of participants 110(A)-(E). Participants 110(A)-(E) may comprise, for example, users, nodes, computing devices, processes, storage devices, applications, etc. Each of participants 110(A)-(E) may store at least one of a plurality of ledger entries 120(A)-(D) and a table of contents (ToC) 130. Each participant 110(A)-(E) each stores ledger entries relevant to that participant as well as the ToC 130 for the complete blockchain. For example, node 110(A) may represent a user device and node 110(B) may represent a printer. A print job sent from node 110(A) to node 110(B) may be stored in blockchain 100 as ledger entry 120(A) at nodes 110(A) and (B). Table of Contents 130 may be updated to reflect that new ledger entry across all of nodes 110(A)-(E). A later transaction may comprise the printer, node 110(B), submitting a log of jobs including the transaction in ledger entry 120(A) to an analytics process represented by node 110(D). This use of the data related to the earlier transaction may also be included in the blockchain 100 and recorded in ledger entry 120(B) stored at nodes 110(B) and 110(D).

Similarly, node 110(C) may represent a second user and node 110(E) may represent s second printer, with a second print job being recorded in blockchain 100 as ledger entry 120(C) stored at nodes 110(C) and 110(E). Second printer node 110(E) may submit a similar log of jobs to the analytics process represented by node 110(D), the details of which may be recorded in ledger entry 120(D) at node 110(0) and 110(E). Again, ToC 130 is updated across all of nodes 110(A)-(E) for the transactions recorded in ledger entries 120(C) and 120(D). Any of nodes 110(A)-(E) may reconstruct the entire blockchain 100 by requesting the ledger entries from the other nodes according to the location and owner details stored in ToC 130. ToC 130 may further comprise error checking and validation information, such as a checksum for the entire blockchain 100.

Figure 2:
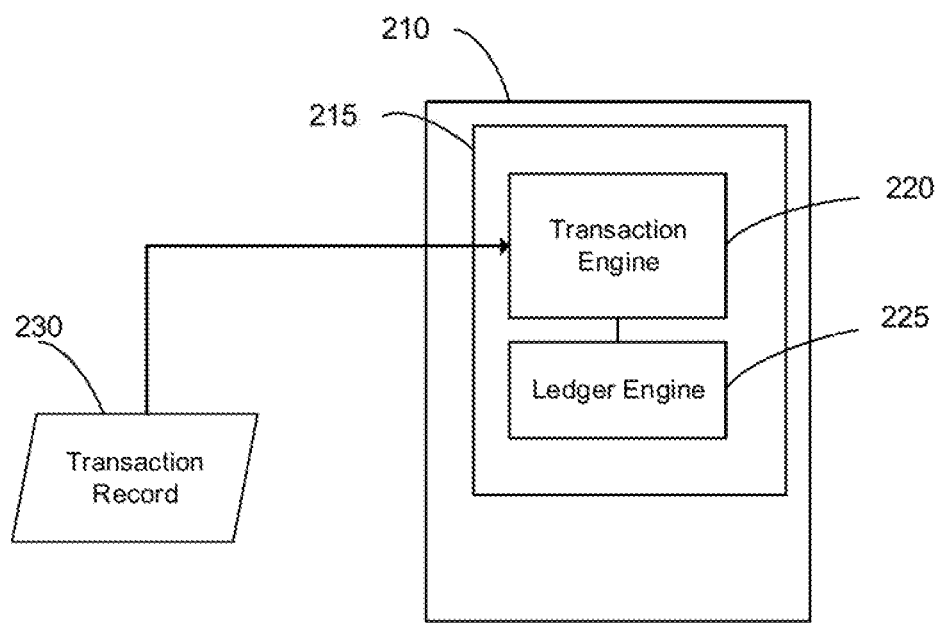
FIG. 2 is an example partial ledger system.

FIG. 2 is a block diagram of an example partial ledger system 200. System 200 may comprise a computing device 210 comprising a memory 215. Computing device 210 may comprise, for example, a general and/or special purpose computer, server, mainframe, desktop, laptop, tablet, smart phone, game console, printer and/or any other system capable of providing computing capability consistent with providing the implementations described herein. Computing device 210 may store, in memory 215, a transaction engine 220 and a ledger engine 225.

Each of engines 220, 225 of system 200 may comprise any combination of hardware and programming to implement the functionalities of the respective engine. In examples described herein, such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement engines 220, 225. In such examples, system 200 may comprise the machine-readable storage medium storing the instructions and the processing resource to execute the instructions, or the machine-readable storage medium may be separate but accessible to system 200 and the processing resource.

Transaction engine 220 may receive a record of a data transaction between two participants and create a ledger entry associated with the record of the data transaction. For example, node 110(A) and node 110(B) may participate in a transaction resulting in a transaction record 230 to be stored in a ledger entry 120(A) of blockchain 100. Transaction engine 220 may process transaction record 230 for appropriate inclusion in blockchain 100, such as by packaging the record with the hash of the previous ledger entry to create a valid blockchain link to create the ledger entry.

Ledger engine 225 may append the ledger entry to a subset of a plurality of partial ledgers associated with a blockchain and update a table of contents associated with each of the plurality of partial ledgers associated with the blockchain. For example, nodes 110(A) and 110(B) may store the newly created ledger entry 120(A) for their transaction while other nodes associated with blockchain 100 may or may not. In some implementations, transaction participants may prefer to store all nodes of blockchain 100 while other participants only store those ledger entries relevant to their transactions. Each node may thus maintain either a full ledger or a partial ledger comprising less than all of the ledger entries associated with the blockchain.

In some implementations, each of the plurality of partial ledgers may comprise a copy of the table of contents. The update to the table of contents associated with each of the plurality of partial ledgers associated with the blockchain by ledger engine 225 may comprise distributing an updated copy of the table of contents to each of the plurality of partial ledgers and/or may comprise distributing information associated with the new ledger entry to each of the plurality of partial ledgers to update the table of contents. In some implementations, each of the plurality of partial ledgers comprises a link to an authoritative copy of the table of contents. For example, a first participant node (e.g., node 110(A)) associated with the blockchain may maintain the authoritative copy of the table of contents 130. In some implementations, each node comprising a partial ledger may maintain a link and/or a copy of the table of contents and may periodically verify that its copy matches the authoritative copy of the table of contents. For example, a node may request that the authoritative copy be provided and/or request verification data such as a checksum and/or digital signature.

The table of contents may comprise a directory of locations of each the plurality of partial ledgers (e.g., the storage location, such as memory 215 of device 210) and/or an order of the plurality of ledger entries in the blockchain. In some implementations, the table of contents may comprise a checksum associated with the correct order of the plurality of ledger entries in the blockchain.

Although one computing device 210 is depicted in FIG. 2, certain implementations of system 200 may comprise more than one computing device 210. At least one of the computing devices may be employed and arranged, for example, in at least one server bank, computer bank, data center, and/or other arrangements. For example, the computing devices together may include a cloud computing resource, a grid computing resource, and/or any other distributed computing arrangement. Such computing devices may be located in a single installation and/or may be distributed among many different geographical locations.

Figure 3:
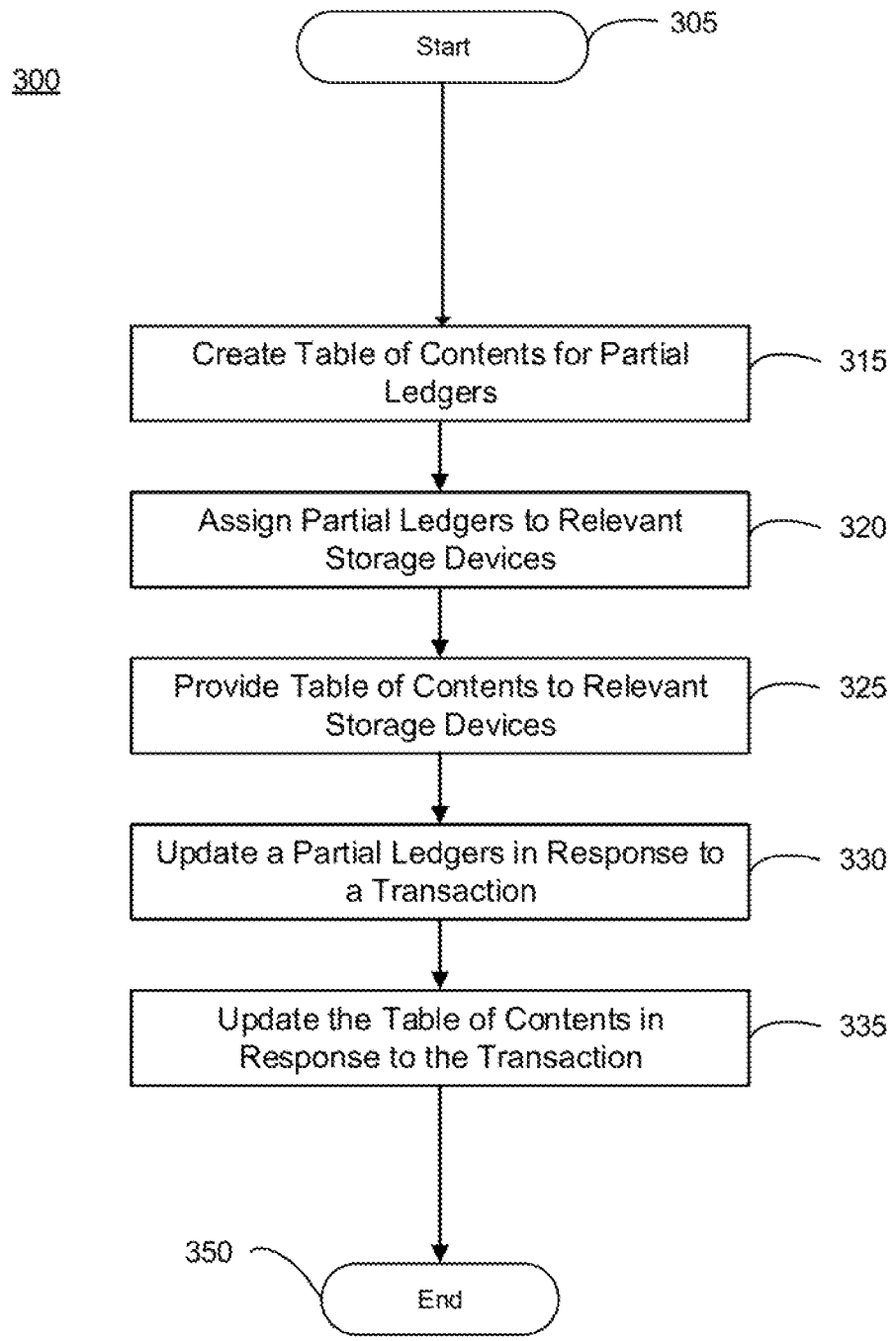
FIG. 3 is a flowchart of an example of a method for providing for the creation of distributed partial ledgers for a blockchain.

FIG. 3 is a flowchart of an example method 300 for providing for the creation of distributed partial ledgers for a blockchain. Although execution of method 300 is described below with reference to computing device 210, other suitable components for execution of method 300 may be used.

Method 300 may begin in stage 305 and proceed to stage 315 where computing device 210 may create a table of contents (ToC) for the plurality of partial ledgers. For example, plurality of nodes 110(A)-(E) may be identified as responsible for storing portions of blockchain 100. Computing device 210 may examine each ledger entry for each transaction recorded by blockchain 100 and determine which of nodes 110(A)-(E) were involved in each transaction. In the example of FIG. 1, Ledger entry 120(A) may be assigned to participant nodes 110(A) and 110(B), ledger entry 120(B) may be assigned to participant nodes 110(B) and 110(D), and so on. Storage locations for each participant in blockchain 100 may be established, such as particular network attached storage devices and/or on device memory. The ledger entry locations and correct transaction order may then be used to establish a ToC file, database entry, or other record type.

Method 300 may then advance to stage 320 where computing device 210 may assign each of the plurality of partial ledgers to a relevant storage device. The blockchain 100 ledger may comprise information about a plurality of transactions among a plurality of transaction participants represented by nodes 110(A)-(E). Each of the plurality of transaction participants may provide the relevant storage device for the partial ledgers associated with their associated transactions. Assigning each of the plurality of partial ledgers to a relevant storage device may comprise identifying the participants in each of the plurality of transactions. For example, ledger entry 120(A) may be assigned to storage locations for nodes 110(A) and 110(C) as participants in the transaction whose details are recorded in ledger entry 120 (A) and stored at those storage locations.

Method 300 may then advance to stage 325 where computing device 210 may provide the table of contents to the relevant storage device for each of the plurality of partial ledgers. In some implementations, each of the plurality of partial ledgers may comprise a copy of the table of contents. The provision of the table of contents may comprise distributing an updated copy of the table of contents to each of the plurality of partial ledgers and/or may comprise distributing information associated with the new ledger entry to each of the plurality of partial ledgers to update the table of contents. In some implementations, each of the plurality of partial ledgers comprises a link to an authoritative copy of the table of contents. For example, a first participant node (e.g., node 110(A)) associated with the blockchain may maintain the authoritative copy of the table of contents 130. In some implementations, each node comprising a partial ledger may maintain a link and/or a copy of the table of contents and may periodically verify that its copy matches the authoritative copy of the table of contents. For example, a node may request that the authoritative copy be provided and/or request verification data such as a checksum and/or digital signature.

The table of contents may comprise a directory of locations of each the plurality of partial ledgers (e.g., the storage location, such as memory 215 of device 210) and/or an order of the plurality of ledger entries in the blockchain. In some implementations, the table of contents may comprise a checksum associated with the correct order of the plurality of ledger entries in the blockchain.

Method 300 may then advance to stage 330 where computing device 210 may update a first partial ledger and a second partial ledger in response to a transaction associated with the blockchain ledger. For example, node 110(A) and node 110(B) may participate in a transaction resulting in a transaction record 230 to be stored in a ledger entry 120(A) of blockchain 100. Transaction engine 220 may process transaction record 230 for appropriate inclusion in blockchain 100, such as by packaging the record with the hash of the previous ledger entry to create a valid blockchain link to create the ledger entry.

Method 300 may then advance to stage 335 where computing device 210 may update the table of contents stored in the associated storage device for each of the plurality of partial ledgers according to the transaction. The update to the table of contents associated with each of the plurality of partial ledgers associated with the blockchain by ledger engine 225 may comprise distributing an updated copy of the table of contents to each of the plurality of partial ledgers and/or may comprise distributing information associated with the new ledger entry to each of the plurality of partial ledgers to update the table of contents. In some implementations, each of the plurality of partial ledgers comprises a link to an authoritative copy of the table of contents.

Method 300 may then end at stage 350.

Figure 4:
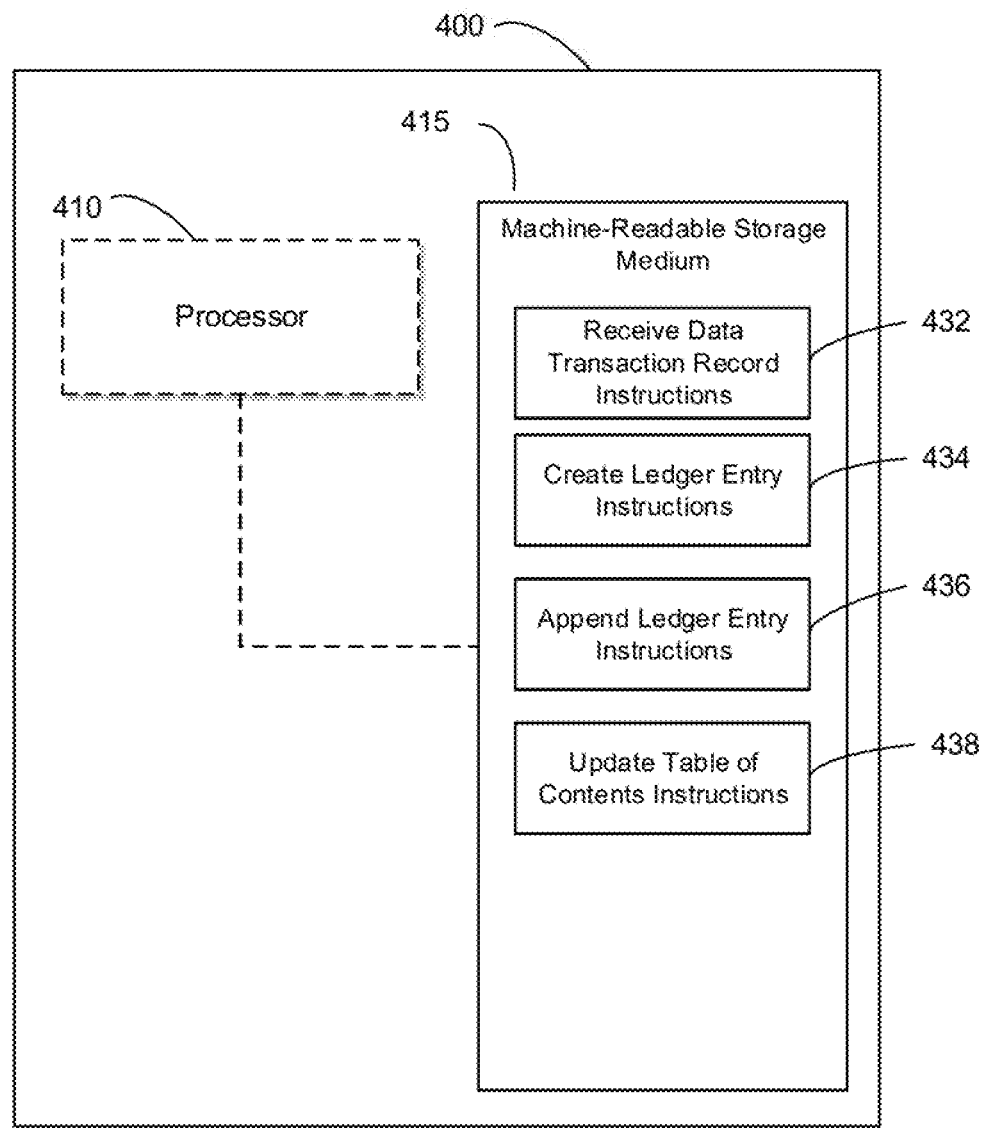
FIG. 4 is a block diagram of an example computing device for providing partial ledgers.

FIG. 4 is a block diagram of an example computing device 400 for providing partial ledgers for a blockchain. Computing device 400 may comprise a processor 410 and a memory 415 comprising a non-transitory, machine-readable storage medium. Memory 415 may comprise a plurality of processor-executable instructions, such as receive data transaction record instructions 432, create ledger entry instructions 434, append ledger entry instruction 436, and update table of contents instructions 438. In some implementations, instructions 432, 434, 436, 438 may be associated with a single computing device 400 and/or may be communicatively coupled among different computing devices such as via a direct connection, bus, or network.

Processor 410 may comprise a central processing unit (CPU), a semiconductor-based microprocessor, a programmable component such as complex programmable logic device (CPLD) and/or field-programmable gate array (FPGA), or any other hardware device suitable for retrieval and execution of instructions stored in machine-readable storage medium 420. In particular, processor 110 may fetch, decode, and execute instructions 432, 434, 436, 438.

Executable instructions 432, 434, 436, 438 may comprise logic stored in any portion and/or component of machine-readable storage medium 415 and executable by processor 410. The machine-readable storage medium 415 may comprise both volatile and/or nonvolatile memory and data storage components. Volatile components are those that do not retain data values upon loss of power. Nonvolatile components are those that retain data upon a loss of power.

The machine-readable storage medium 415 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Receive data transaction record instructions 432 may receive a record of a data transaction between two participants. For example, node 110(A) and node 110(B) may participate in a transaction resulting in a transaction record 230 to be stored in a ledger entry 120(A) of blockchain 100. Transaction engine 220 may process transaction record 230 for appropriate inclusion in blockchain 100, such as by packaging the record with the hash of the previous ledger entry to create a valid blockchain link to create the ledger entry.

Create ledger entry instructions 434 may create a ledger entry associated with the record of the data transaction. For example, create ledger entry instructions 434 may process transaction record 230 for appropriate inclusion in blockchain 100, such as by packaging the record with the hash of the previous ledger entry to create a valid blockchain link to create the ledger entry, such as ledger entry 120(A).

Append ledger entry instruction 436 may append the ledger entry to a subset of a plurality of partial ledgers associated with a blockchain. For example, the ledger entry may be added to a subset of a plurality of partial ledgers associated with a blockchain at a particular participant's node. For example, nodes 110(A) and 110(B) may store the newly created ledger entry 120(A) for their transaction while other nodes associated with blockchain 100 may or may not. In some implementations, transaction participants may prefer to store all nodes of blockchain 100 while other participants only store those ledger entries relevant to their transactions. Each node may thus maintain either a full ledger or a partial ledger comprising less than all of the ledger entries associated with the blockchain.

Update table of contents instructions 438 may update a table of contents associated with each of the plurality of partial ledgers associated with the blockchain. For example, In some implementations, each of the plurality of partial ledgers may comprise a copy of the table of contents. The update to the table of contents associated with each of the plurality of partial ledgers associated with the blockchain by ledger engine 225 may comprise distributing an updated copy of the table of contents to each of the plurality of partial ledgers and/or may comprise distributing information associated with the new ledger entry to each of the plurality of partial ledgers to update the table of contents. In some implementations, each of the plurality of partial ledgers comprises a link to an authoritative copy of the table of contents. For example, a first participant node (e.g., node 110(A)) associated with the blockchain may maintain the authoritative copy of the table of contents 130. In some implementations, each node comprising a partial ledger may maintain a link and/or a copy of the table of contents and may periodically verify that its copy matches the authoritative copy of the table of contents. For example, a node may request that the authoritative copy be provided and/or request verification data such as a checksum and/or digital signature.

The table of contents may comprise a directory of locations of each the plurality of partial ledgers (e.g., the storage location, such as memory 215 of device 210) and/or an order of the plurality of ledger entries in the blockchain. In some implementations, the table of contents may comprise a checksum associated with the correct order of the plurality of ledger entries in the blockchain.

The disclosed examples may include systems, devices, computer-readable storage media, and methods for document element re-positioning. For purposes of explanation, certain examples are described with reference to the components illustrated in the Figures. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a" "an," and "the" are intended to include the plural forms as well, unless the context indicates otherwise. Additionally, although the terms first, second, etc. may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

What is claimed is:

1. A system, comprising:
    a transaction engine to:
        receive a record of a data transaction between two participants, and
        create a ledger entry associated with the record of the data transaction; and a ledger engine to:
        append the ledger entry to a subset of a plurality of partial ledgers associated with a blockchain; and
        update a table of contents associated with each of the plurality of partial ledgers associated with the blockchain, wherein the table of contents comprises a correct transaction order of the plurality of ledger entries in the blockchain and a checksum associated with the correct transaction order of the plurality of ledger entries in the blockchain.

2. The system of claim 1, wherein each partial ledger comprises a plurality of ledger entries.

3. The system of claim 2, wherein each of the plurality of partial ledgers comprises less than all of the ledger entries associated with the blockchain.

4. The system of claim 1 wherein the ledger engine appends the ledger entry to the subset of the plurality of partial ledgers stored by participants in the data transaction.

5. The system of claim 1, wherein the table of contents comprises a directory of locations of each the plurality of partial ledgers.

6. The system of claim 1, wherein each of the plurality of partial ledgers comprises a copy of the table of contents.

7. The system of claim 1 wherein the update to the table of contents associated with each of the plurality of partial ledgers associated with the blockchain comprises distributing an updated copy of the table of contents to each of the plurality of partial ledgers.

8. The system of claim 1, wherein each of the plurality of partial ledgers comprises a pointer to an authoritative copy of the table of contents.

9. A method comprising:
    creating a table of contents for a plurality of partial ledgers, wherein the table of contents comprises a correct transaction order of a plurality of ledger entries in at least one of the plurality of partial ledgers and a checksum associated with the correct transaction order of the plurality of ledger entries in the at least one of the plurality of partial ledgers;
    assigning each of the plurality of partial ledgers to a relevant storage device;
    providing the table of contents to the relevant storage device for each of the plurality of partial ledgers;
    updating a first partial ledger and a second partial ledger in response to a transaction associated with the blockchain ledger; and
    updating the table of contents stored in the associated storage device for each of the plurality of partial ledgers according to the transaction.

10. The method of claim 9, wherein the blockchain ledger comprises information about a plurality of transactions among a plurality of transaction participants.

11. The method of claim 10, wherein assigning each of the plurality of partial ledgers to a relevant storage device comprises identifying the participants in each of the plurality of transactions.

12. The method of claim 11, wherein each of the plurality of transaction participants provides the relevant storage device for the partial ledgers associated with their associated transactions.

13. A non-transitory machine readable medium storing instructions executable by a processor to:
    receive a record of a data transaction between two participants;
    create a ledger entry associated with the record of the data transaction;
    append the ledger entry to a subset of a plurality of partial ledgers associated with a blockchain; and
    update a table of contents associated with each of the plurality of partial ledgers associated with the blockchain, wherein the table of contents comprises a correct transaction order of a plurality of ledger entries in the blockchain and a checksum associated with the correct transaction order of the plurality of ledger entries in the blockchain.

* * * * *